(12) United States Patent
Sato

(10) Patent No.: US 7,830,917 B2
(45) Date of Patent: Nov. 9, 2010

(54) RADIO INTEGRATED CIRCUIT SENDING ACKNOWLEDGEMENT DATA BASED ON JUDGEMENT OF FRAME PENDING

(75) Inventor: Shigeyuki Sato, Miyazaki (JP)

(73) Assignee: Oki Semiconductor Co., Ltd. (JP)

( * ) Notice: Subject to any disclaimer, the term of this patent is extended or adjusted under 35 U.S.C. 154(b) by 1005 days.

(21) Appl. No.: 11/354,087

(22) Filed: Feb. 15, 2006

(65) Prior Publication Data

US 2006/0182188 A1 Aug. 17, 2006

(30) Foreign Application Priority Data

Feb. 17, 2005 (JP) ............................. 2005-040082

(51) Int. Cl.
*H04W 4/00* (2009.01)

(52) U.S. Cl. .................. 370/469; 370/474; 714/819; 714/53

(58) Field of Classification Search ................ 370/464, 370/465, 469, 474; 455/73; 714/799, 819, 714/1, 48, 53
See application file for complete search history.

(56) References Cited

U.S. PATENT DOCUMENTS 5,319,644 A * 6/1994 Liang ......................... 370/452

| 7,031,313 B2 * | 4/2006 | Yazaki et al. ............... 370/392 |
| 7,076,595 B1 * | 7/2006 | Dao et al. .................... 710/317 |
| 7,158,501 B2 * | 1/2007 | Kasami et al. .............. 370/339 |
| 2006/0059329 A1 * | 3/2006 | Morris et al. .................. 713/1 |

OTHER PUBLICATIONS

Fukunaga et al., "Development of Ubiquitous Sensor Network", Oct. 2004, No. 200, vol. 71, No. 4, Oki Technical Review, pp. 24-29 (translation).

* cited by examiner

*Primary Examiner*—William Trost, IV
*Assistant Examiner*—Siming Liu
(74) *Attorney, Agent, or Firm*—Studebaker & Brackett PC; Donald R. Studebaker

(57) ABSTRACT

A radio LSI is provided that is not to cause a delay in sending acknowledgement data. A latch circuit provided in a sending/receiving section latches frame control information out of data being received. A decoder decodes the frame control information to decode a data length and structure of an address field. Furthermore, a latch circuit latches the address-field data of the reception data according to the decoded address-field information. A comparing circuit compares a content of a register entered with an address of the opposite-of-communication completely prepared data to be sent, with a source address of the data being received, to determine a setting/resetting of frame pending in acknowledgement data. A content of the determination is sent to a data-link section. This provides information required for acknowledgement data before completely receiving data, thus eliminating the possibility to cause a delay in sending acknowledgement data.

9 Claims, 11 Drawing Sheets

FIG. 2

| Preamble-Sequence | Start of Frame Delimiter | Frame-Length | Frame-Control | Sequence-Number | Addressing-Field | Data-Payload | FCS |
|---|---|---|---|---|---|---|---|
| 4 BYTES | 1 BYTE | 1 BYTE | 2 BYTES | 1 BYTE | 0-21 BYTES | 0-122 BYTES | 2 BYTES |

Preamble-Sequence : PREAMBLE
Start of Frame Delimiter : TRANSMER START INFORMATION
Frame-Length : FRAME LENGTH INFORMATION
Frame-Control : FRAME CONTROL INFORMATION
Sequence-Number : SEQUENCE NUMBER
Addressing-Field : ADDRESS FIELD
Data-Payload : DATA FIELD
FCS : Frame-Check-Sequence : ERROR CHECK INFORMATION

FIG. 3

| BIT | 1-2 | 3 | 4 | 5 | 6 | 7-9 | 10-11 | 12-13 | 14-15 |
|---|---|---|---|---|---|---|---|---|---|
| | Frame-Type | Security-enable | Frame-Pending | ACK-req | Intra-PAN | Reserved | Dest-addressing-Mode | Reserved | Source-addressing-Mode |

Frame-Type           : FRAME TYPE
Security-enable      : SECURITY PERMISSION
Frame-Pending        : FRAME PENDING
ACK-req              : ACKNOWLEGEMENT REQUEST
Intra-PAN            : INTRA-PAN
Dest-addressing-Mode : DESTINATION ADDRESSING MODE
Source-addressing-Mode : SOURCE ADDRESSING MODE
Reserved             : UNDEFINED

FIG. 4

| 0/2 BYTES | 0/2/8 BYTES | 0/2 BYTES | 0/2/8 BYTES |
|---|---|---|---|
| Destination-PAN-identifier | Destination-Address | Source-PAN-identifier | Source-Address |

Destination-PAN-identifier : DESTINATION PAN IDENTIFIER INFORMATION
Destination-Address : DESTINATION ADDRESS
Source-PAN-identifier : SOURCE PAN IDENTIFYING INFORMATION
Source-Address : SOURCE ADDRESS

FIG. 5

| 1 BYTE | 2 BYTES | 1 BYTE | 2 BYTES |
|---|---|---|---|
| Length | Frame-Control | Sequence-Number | FCS |

Length : DATA LENGTH
Frame-Control : FRAME CONTROL INFORMATION
Sequence-Number : SEQUENCE NUMBER
FCS : ERROR CHECK INFORMATION T1: ANALYZING FRAME CONTROL INFORMATION VALUE, TO DETERMINE A DATA LENGTH AND STRUCTURE OF THE SUBSEQUENT ADDRESS FIELD T2: COMPARING BETWEEN ADDRESS-FIELD DATA AND DATA SET IN REGISTER, TO DETERMINE A SETTING/RESETTING FRAME PENDING T1: ANALYZING FRAME CONTROL INFORMATION VALUE, TO DETERMINE A DATA LENGTH AND STRUCTURE OF THE SUBSEQUENT ADDRESSING FIELD T2: LATCHING ADDRESSING-FIELD DATA, TO MAKE A NOTIFICATION TO MAC BY INTERRUPTION

RADIO INTEGRATED CIRCUIT SENDING ACKNOWLEDGEMENT DATA BASED ON JUDGEMENT OF FRAME PENDING

BACKGROUND OF THE INVENTION

1. Field of the Invention

The present invention relates to a radio integrated circuit (hereinafter, referred to as "radio LSI") compatible with Zig-Bee (ZigBee Alliance's registered trademark), one of the near-distance radio communication technology standards that the physical layer interface conforms to IEEE (Institute of Electrical and Electronic Engineers) 802.15.4 and the 2.4 GHz frequency band, similar to IEEE 802.11b of the radio LAN (local area network) standard, is utilized by segmented into 16 channels, and more particularly to a technique for controlling the reception data thereof.

2. Description of the Related Art

FIG. 1 shows a communication hierarchical model of ZigBee.

The lowermost physical layer 1, for sending/receiving actual data, defines an applicable radio frequency, modulation scheme, data rate and the like. A data-link layer 2, for sending/receiving data through the physical layer 1, has a media access control (MAC) layer and defines a format, etc. of transmission/reception data. Those physical layer 1 and data-link layer 2 conform to IEEE802.15.4.

A network layer 3 is for data transfer management at between two nodes connected over the network. A transport layer 4 is for communication management while a session layer 5 is for management of communication at from a beginning to end thereof. Meanwhile, a presentation layer 6 is for an interface management of between an application layer 7 and the session layer 5 that are to perform an actual data processing.

FIG. 2 shows a format of the data to be sent/received at the physical layer 1.

The beginning 4 bytes are of a preamble (Preamble-Sequence) to take a synchronism upon reception, which is followed by 1-byte transfer start information (Start of Frame Delimiter) and 1-byte frame length information (Frame-Length). The frame length information represents a length of the subsequent data (bytes). Following the frame length information, frame control information (Frame-Control) representative of a data type continues 2 bytes. Following the frame control information, a sequence number (Sequence-Number) continues 1 byte and further continued by address and data fields (Address-Field, Data-Payload) that are variable in length. In the last of the data field, there is added 2-byte error check information (FCS: Frame-Check-Sequence).

FIG. 3 shows a data structure of the frame control information in FIG. 2.

The frame control information is structured with 2-bit frame type (Frame-Type), 1-bit security permission (Security-enable), 1-bit frame pending (Frame-Pending), 1-bit acknowledgement request, 1-bit intra-PAN (Intra-PAN), 2-bit destination addressing mode (Dest-Addressing-Mode) and 2-bit source addressing mode (Source-Addressing-Mode). The other bits are undefined (Reserved).

The frame type is representative of which one of beacon, data, response signal and command the present frame is. The security permission represents whether or not to send/receive data by ciphering. The frame pending represents whether or not to send data subsequently when sending an acknowledgement, referred later. The acknowledgement request is representative of whether or not to request an acknowledgement of data to the opposite-of-communication the data has been sent.

The intra-PAN, the destination addressing mode and the source addressing mode are to designate a representation form, i.e. data length and structure, of the FIG. 2 Address-Field. For example, in an addressing mode, designated is a segmented bit number (16 bits or 64 bits) for use in addressing.

FIG. 4 shows a data structure of the FIG. 2 address field.

The address field is structured with 0- or 2-byte destination-PAN identifying information (Destination-PAN-identifier), 0-, 2- or 8-byte destination address (Destination-Address), 0- or 2-byte source-PAN identifying information (Source-PAN-identifier), and 0-, 2- or 8-byte source address (Source-Address). Those pieces of identifier information and addressing byte number are to be designated by the intra-PAN, destination addressing mode and source addressing mode of the frame control information.

FIG. 5 shows a structure of acknowledgement data.

The acknowledgement data is to be responded to the sender from the receiver when receiving data in the case acknowledgement is requested for the data from the sender. This has 1-byte data length (Length), 2-byte frame control information (Frame-Control), 1-byte sequence number (Sequence-Number) and 2-byte error check information (FCS). The Frame control information has the same data structure as that of the frame control information in FIG. 2, that is, the frame control information detailed in FIG. 3.

The radio LSIs for ZigBee are different in LSI specification depending upon with what functional bocks is configured the physical layer 1, data link layer 2 and network layer 3 in the FIG. 2 communication hierarchical mode. For example, in a radio LSI comparatively small in scale, an IC chip is made with only a radio sending/receiving section formed by an analog radio circuit for sending/receiving a radio-frequency signal and a physical layer wherein the processing in the data-link layer or higher is on software by means of a central processing unit (hereinafter, referred to as "CPU") on the host side. Meanwhile, Oki Technical Review, Oki Electric, 2004.10.1, vol. 71, No. 4, p. 24-29 (Non-patent Document 1), describes an art that a chip is made with up to a MAC layer of the radio sending/receiving section, physical later and data-link layer, to realize a radio LSI conforming to IEEE802.15.4 so that a ZigBee network can be controlled by a low-competent host CPU by performing a complicated MAC processing within the radio LSI.

In any of radio LSIs, data transmission/reception is controlled in the physical layer 1 while reception data is analyzed in the data-link layer 2, thus enabling data transmission/reception with a host-side CPU according to a designated transfer mode.

FIG. 6 is a configuration diagram of the conventional ZigBee reception circuit.

The reception circuit has a radio-frequency part 11 for converting a radio-frequency signal RF received at the antenna into a base-band signal, a demodulating part 12 for converting the base-band signal into symbol data, a physical-layer part 13 for converting symbol data into byte data and controlling data transmission/reception, a data-link section 14 for analyzing the data provided from the physical layer part 13 and ciphering it as required, and a network section 15 for sending/receiving data with the host-side CPU.

FIG. 7 shows a process flow of reception data on the reception circuit in FIG. 6.

At step S1, the data of the radio-frequency signal RF received at the radio-frequency part 11 is converted into a base-band signal and then, at step S2, converted into symbol data by the modulating part 12.

At step S3, the symbol data is converted into byte data by the physical layer part 13 (one symbol received at an interval of 16 μs, two symbols constituting 1-byte data). The reception data, converted into byte data, is held until data is gathered in an amount of one frame, and then delivered to the data-link section 14.

At step S4, the reception data is analyzed by the data-link section 14.

At first, the address field (see FIG. 4) items are decoded as to data length and structure depending upon the Intra-PAN, destination addressing mode and source addressing mode of the frame control information (see FIG. 3).

Then, it is determined whether or not the data is destined for the circuit of its own, depending upon the destination-PAN identifying information and destination address in the address field. When the data is destined for the circuit of its own, reference is made to source-PAN identifying information, source address and a previously registered database, to determine whether or not there is a setting in a security mode.

When there is no setting of a security mode, the reception data is delivered, as it is, to the network section 15. When there is a setting of a security mode, the reception data is decoded by setting up necessary data for encryption/decryption and then delivered to the network section 15.

Furthermore, it is examined whether or not there is a setting of acknowledgement request in the frame control information. When there is a setting of acknowledgement request, response is made with a frame containing acknowledgement data (see FIG. 5) to the sender. At this time, in the case of outputting data subsequently to outputting of acknowledgement data, frame pending (see FIG. 3) is set up in the frame control information of the acknowledgement data and then sent.

At step S5, the reception data is sent from the network section 15 to the host-side CPU.

SUMMARY OF THE INVENTION

However, the reception circuit involves the following problem.

Namely, in the case the data completely received by the physical layer part 13 is analyzed in the data-link section 14, the Intra-PAN, destination addressing mode and source addressing mode in the frame control information is first examined to decode a data length and structure as to each item in the address field. Then, determination is made as to whether or not the data is destined for the circuit of its own, depending upon the destination-PAN identifying information and destination address in the address field.

In case the data is destined for the circuit of its own, reference is made to the source-PAN identifying information, source address and previously-registered database, to determine where there is a setting of a security mode. When in a security mode, data is set up that is required for encryption/decryption.

Furthermore, a checking is performed as to whether or not there is a setting of acknowledgement request in the frame control information. When there is a setting of acknowledgement request, a checking is performed as to whether there is data to be outputted subsequently to acknowledgement data. Depending upon it, the acknowledgement data is set with frame pending in the frame control information thereof and sent with a frame containing the acknowledgement data to the sender.

The data-link section 14 are to make a processing of those all on software, requiring an increasing number of process steps. With a certain processability of a processor used or in a certain situation in that time, there might be encountered a processing delay, resulting in a fear that acknowledgement data cannot be sent in a prescribed time (within 192 μs).

It is an object of the present invention to provide a radio LSI that can send acknowledgement data without a delay by increasing the rate of reception data control.

The present invention provides a radio LSI having an sending/receiving section that is to restore reception data in a predetermined format by demodulating a radio signal sent conformingly to a predetermined radio communication standard, and to send, with modulation, acknowledgement data generated according to information designated by the reception data, by means of a radio signal conforming to the radio communication standard, and a data-link section that is to receive the reception data restored in the sending/receiving section and to generate the acknowledgement data when there is designated an acknowledgement for the reception data, the circuit wherein the sending/receiving section is constituted to perform a process for analyzing the reception data and a process for judging a frame pending.

The sending/receiving section according to this aspect of the invention may include a first holding part that monitors the reception data under restoration and holds frame control information, of the reception data, containing information concerning a representing form of a source address; a decoding part that decodes the frame control information held in the first holding part and outputs information about a data length and structure of address field representative of the source address in the. reception data; a second holding part that holds the source address out of the reception data under restoration, according to the data length and structure of address field outputted from the decoding part; a registering part that registers an address of an opposite-of-communication where there is data to be sent subsequently to the acknowledgement data; and a comparing part that compares the source address held in the second holding part with the address of the opposite-of-communication registered in the registering part and provides a result of comparison to the data-link section.

The invention has, in the sending/receiving section, the first holding part that monitors reception data being received and holds it when frame control information is received, and the decoding part that decodes a data length and structure of address field depending upon the information held. This makes it possible to know a field representative of a source address during receiving data. Furthermore, because of the provision of the comparing part that compares an address represented in the addressing field with an address registered in the registering part, it can be determined, during reception, whether or not there is data to be sent to the source. Accordingly, there is an effect that the data-link section is allowed to send acknowledgement data without encountering a delay.

The sending/receiving section may be constituted to perform a process .for analyzing the reception data. The sending/receiving section according to this aspect of the invention may include a holding part that monitors the reception data under restoration and holds frame control information, of the reception data, containing information concerning a representing form of a source address; a decoding part that decodes the frame control information held in the holding part and outputs information about a data length and structure of address field representative of the source address in the reception data; and an interrupt control part that notifies data of the source address by performing an interrupt to the data-link section at a time when data of the source address is successfully captured from the reception data, while the sending/receiving section performs monitoring of the reception data under restoration according to the data length and structure of address field outputted from the decoding part.

BRIEF DESCRIPTION OF THE DRAWINGS

FIG. 2 is a figure showing a format of data to be sent/received by the physical layer;

FIG. 3 is a figure showing a data structure of FIG. 2 frame control information;

FIG. 4 is a figure showing a data structure of FIG. 2 address field;

FIG. 5 is a figure showing a structure of acknowledgement data;

DETAILED DESCRIPTION OF THE INVENTION

Figure 1:
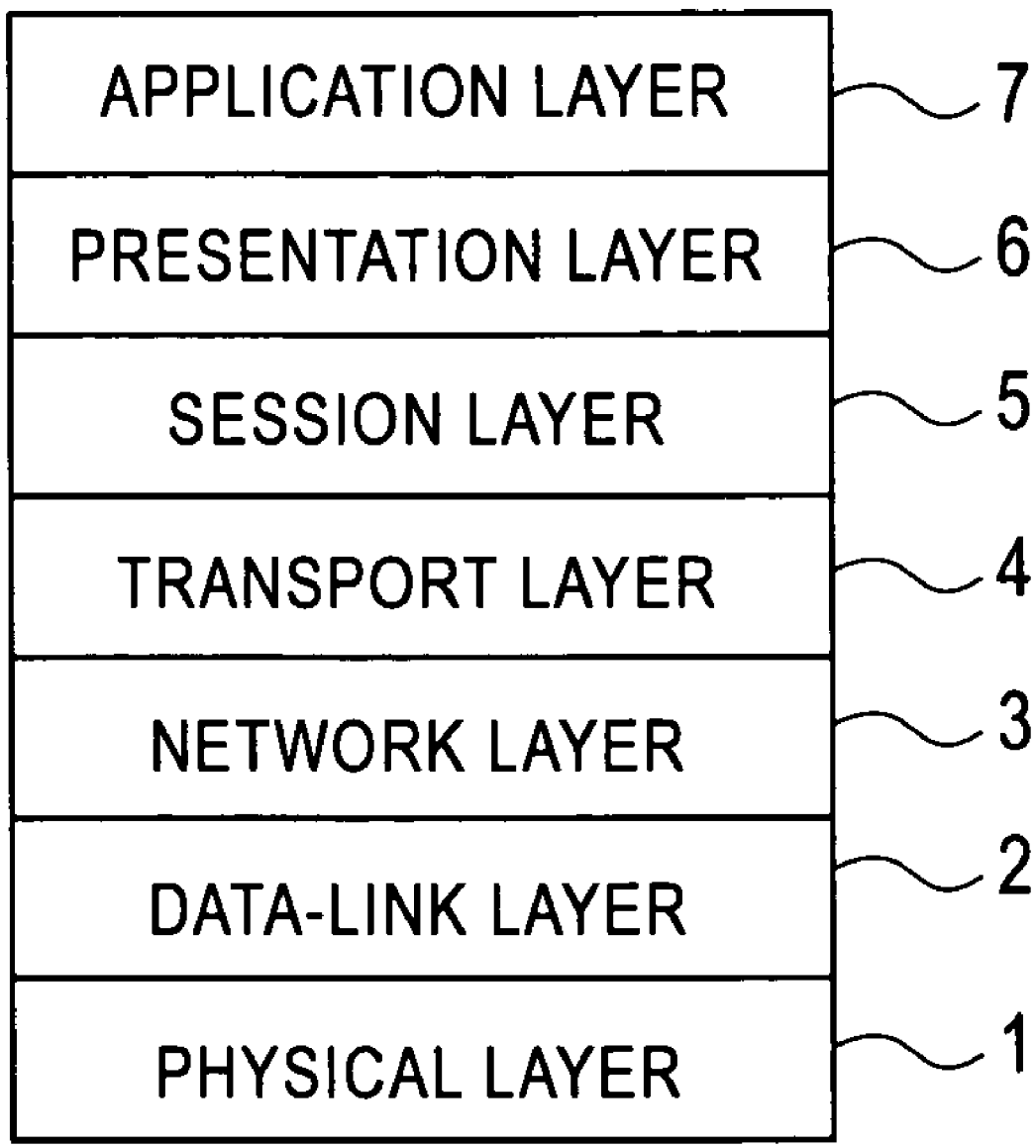
FIG. 1 is a figure showing a communication hierarchical model under ZigBee.
Figure 6:
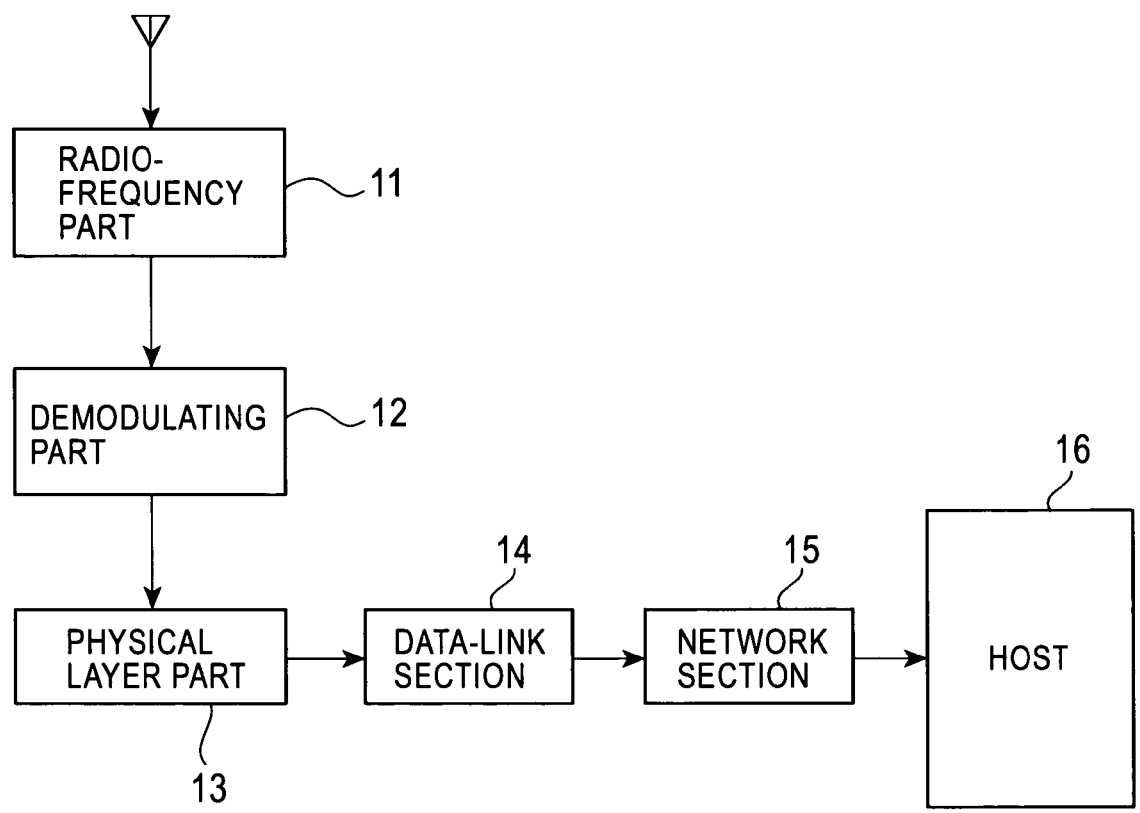
FIG. 6 is a configuration diagram of a conventional ZigBee reception circuit.
Figure 7:
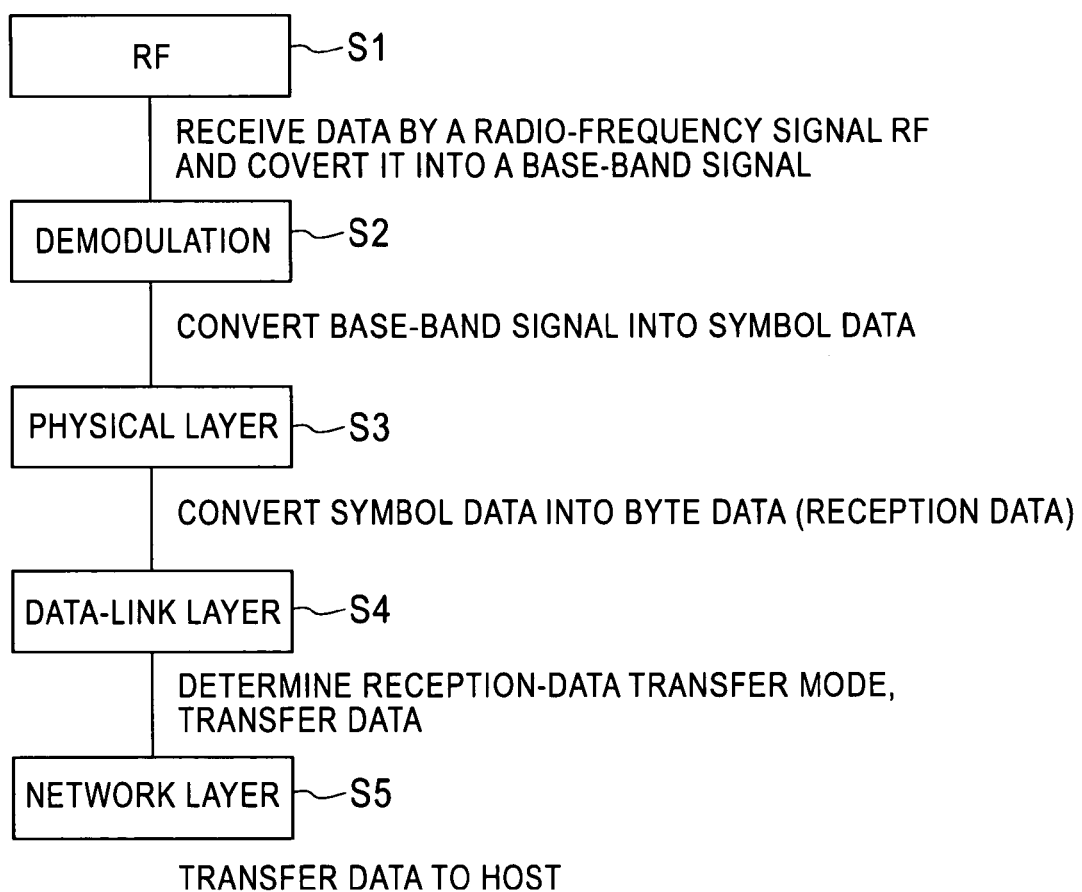
FIG. 7 is a figure showing a process flow of reception data in the FIG. 6 reception circuit.
Figure 8:
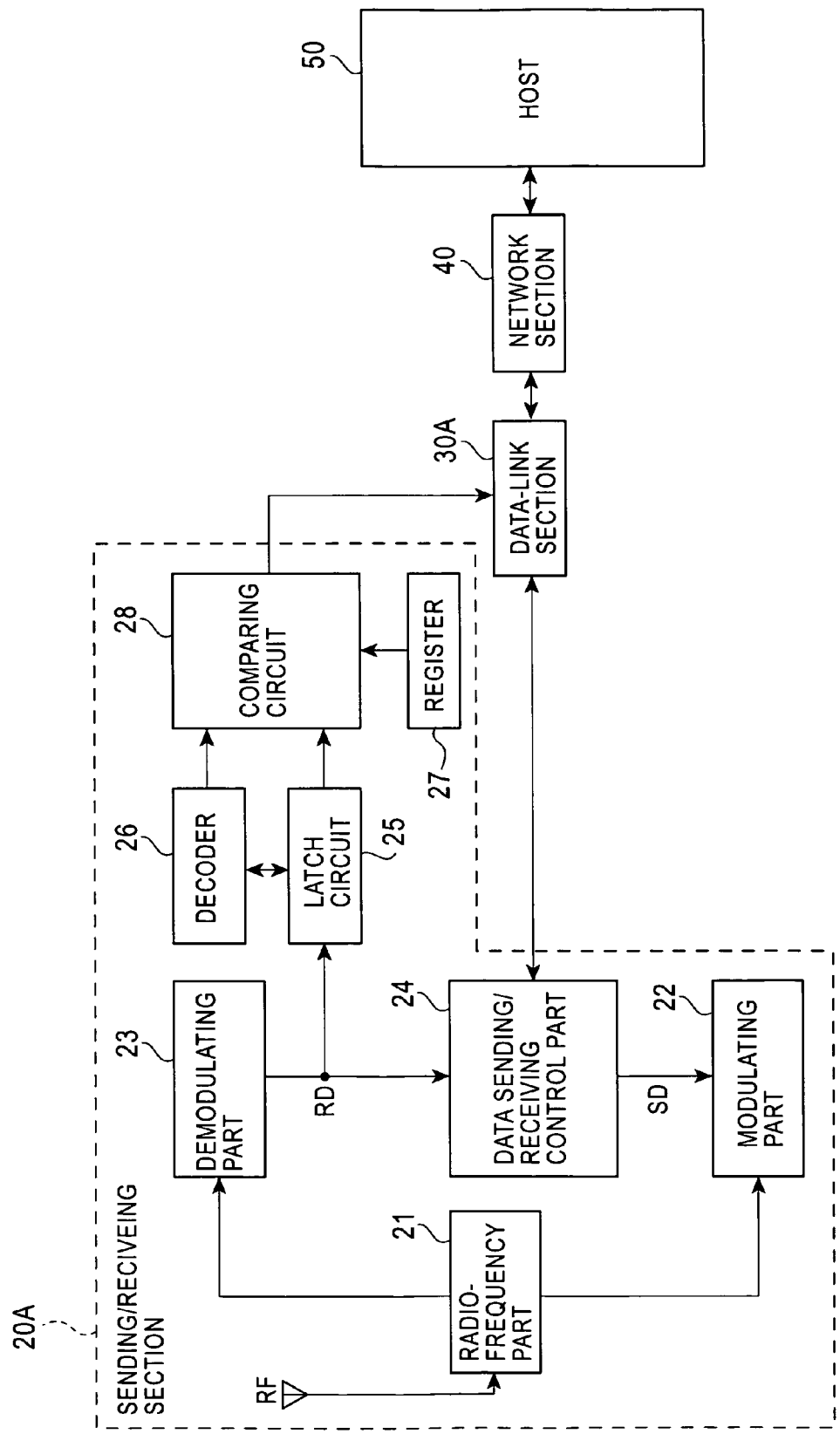
FIG. 8 is a schematic functional block diagram of a radio LSI showing a first embodiment of the invention.

FIG. 8 is a schematic functional block diagram of a radio LSI showing a first embodiment of the present invention.

The radio LSI is compatible with ZigBee, a standard for near-distance radio communication technology. This LSI is made in an IC-chip including a transmitting-receiving section 20A as a hardware realizing a physical layer to perform data transmission and reception on a radio-frequency signal RF, a data-link section 30A having a MAC processing part, etc. to send and receive data through the transmitting-receiving section 20A and for realizing a processing in the data-link layer, and a network section 40 for transferring data with a host 50, and so on.

The transmitting-receiving section 20A has a radio-frequency part 21 for sending and receiving a 2.4-GHz-band radio-frequency signal RF through an antenna built-in or separately arranged, a modulating part 22 for modulating transmission data SD into an O-QPSK (offset orthogonal phase shift keying) signal and supplying it to the radio-frequency part 21, a demodulating part 23 for restoring a reception data RD from the O-QPSK signal received at the radio-frequency circuit 21, and a data transmission-reception control circuit 24 for transferring transmission and reception data SD, RD with the data-link section 30A and taking the overall control as to transmission and reception.

Furthermore, the transmitting-receiving section 20A has first and second hold means (e.g. latch circuit) 25, decode means (e.g. decoder) 26, register means (e.g. register) 27 and comparing means (e.g. comparing circuit) 28 as hardware so as to generally execute a part of processing for the MAC processing part in the data-link layer.

The latch circuit 25 has an input of the reception data RD restored by the demodulating circuit 23, to monitor the reception data RD and hold a part thereof, i.e. frame control information (Frame-Control) and address field (Address-Field). The decoder 26 is to analyze the frame control information held in the latch circuit 25 and determine a data length and structure of the address field thereof.

The register 27 is to establish device information for making a setting/resetting of frame pending (Frame-Pending). The register 27 is adapted to register the address of an opposite-of-communication whose data has been prepared for sending. Meanwhile, the comparing circuit 28 is to compare between the address of the opposite-of-communication set up in the register 27 and the address represented in the address field in the reception data RD. A result of comparison of the comparing circuit 28 is to be provided to the data-link section 30A.

The data-link section 30A is to perform a processing of data-link layer depending upon a comparison result provided from the comparing circuit 28. Accordingly, there is omitted the processing conventionally done in the MAC processing part, in its address-field analysis process and frame-pending determination process.

Figure 9:
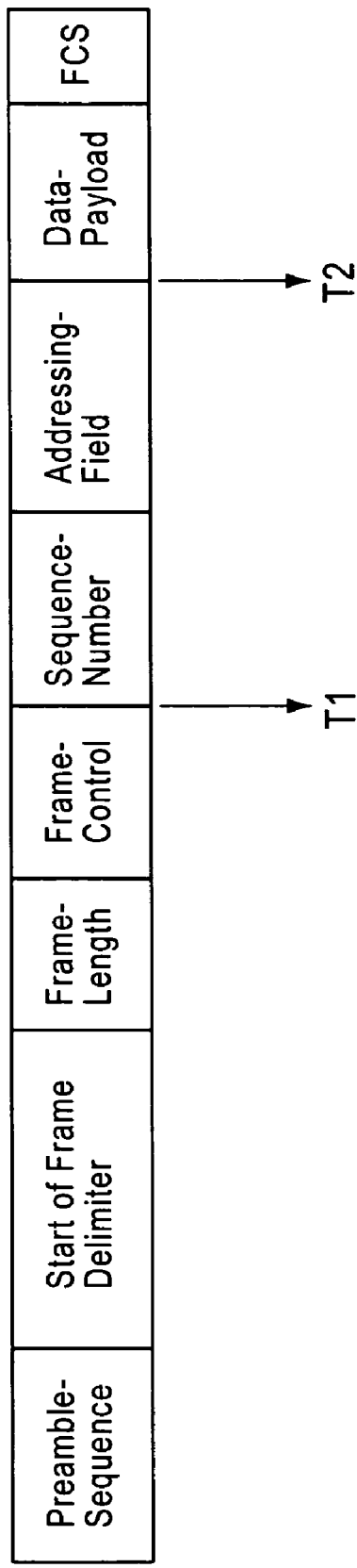
FIG. 9 is a figure showing a process flow of reception data in the first embodiment.

FIG. 9 shows a reception-data processing flow in the first embodiment.

The radio-frequency signal RF received at the antenna is converted into a base-band signal by the radio-frequency part 21 and then demodulated into reception data RD by the demodulating part 23. The demodulated reception data RD is provided to the data transmission-reception control circuit 24 and temporarily held therein, and also provided to the latch circuit 25.

The latch circuit 25 holds the frame control information at a time the frame control information (Frame-Control) in the reception data RD supplied is fixed, or in other words successfully received, (time T1). The frame control information thus held is immediately supplied to the decoder 26. The decoder 26 determines a data length and data structure of the address field depending upon the frame control information supplied. The data length and structure of address field is provided to the latch circuit 25.

The latch circuit 25, this time, latches the address field of the reception data RD according to the information of address-field data length and structure determined by the decoder 26 (time T2). The address-field information latched by the latch circuit 25 is provided to the comparing circuit 28.

The comparing circuit 28 compares between the address set up in the register 27 and the information in the address field, and determines a setting/resetting of frame pending (Frame-Pending), thus outputting a result thereof to the data-link section 30A.

The data-link section 30A prepares acknowledgement data depending upon the information of comparison result provided from the comparing circuit 28, and requests the data transmission-reception control part 24 to send acknowledgement data after the reception of the reception data RD is completed. The acknowledgement data is delivered from the data transmission-reception control part 24 to the modulating part 22 where it is modulated into an O-QPSK signal. This signal, in the radio-frequency part 21, is converted into a radio-frequency signal RF and then sent through the antenna.

Figure 10A:
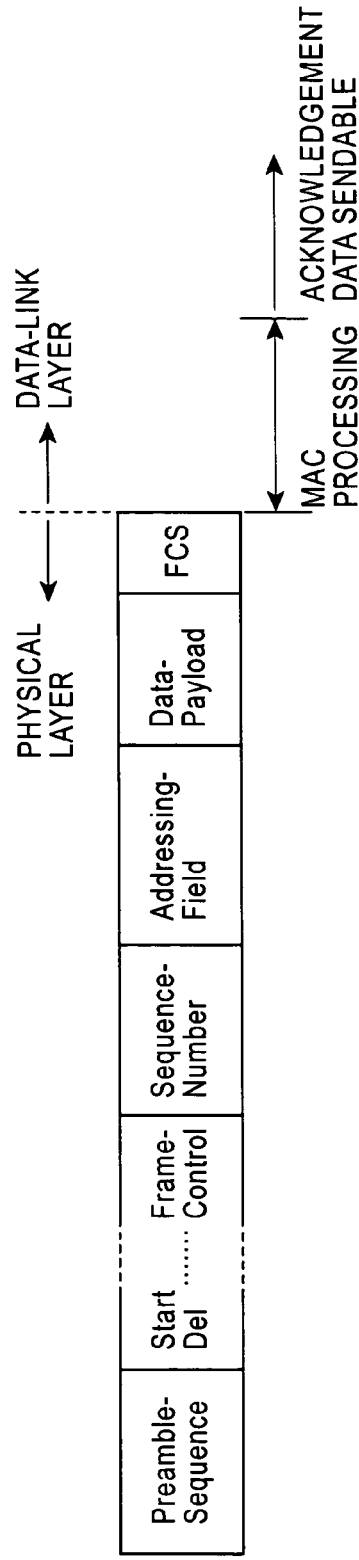
FIGS. 10A and 10B are explanatory figures concerning the effect of the first embodiment.
Figure 10B:
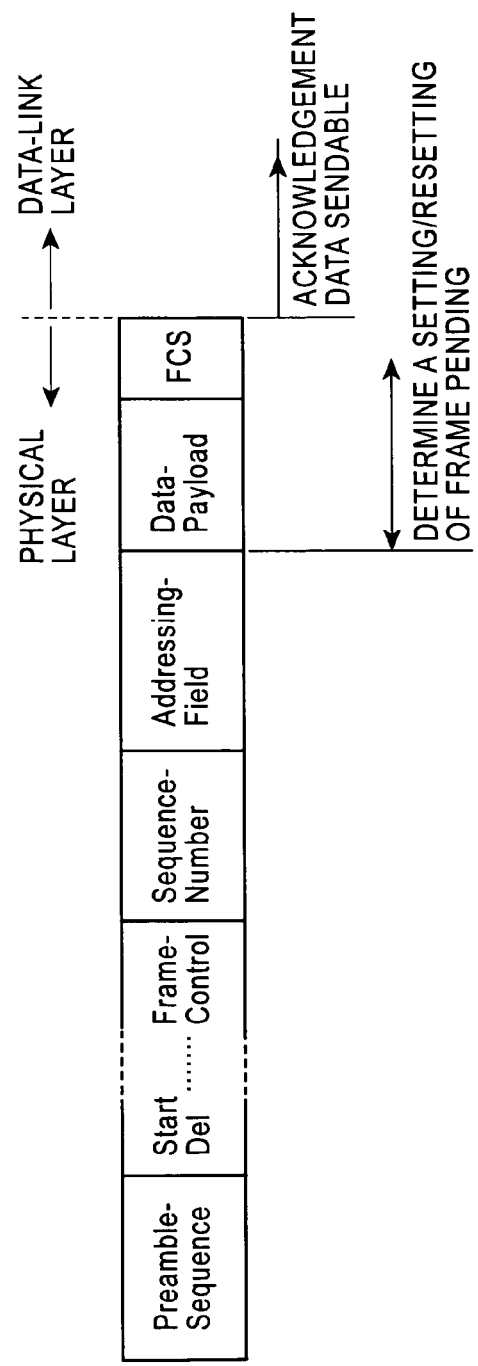

FIGS. 10A and 10B are figures explaining the effect due to the first embodiment.

It is a conventional practice to deliver the reception data RD in batch from the physical layer to the data-link layer in a stage after completely received the reception data RD, to thereby generate acknowledgement data by the MAC processing in the data-link layer, as shown in FIG. 10A.

On the contrary, in the first embodiment, the information about a setting/resetting of frame pending is delivered to the data-link layer at a time point completing the reception of the addressing field of the reception data RD. Accordingly, the data-link layer, because previously known the information required for acknowledgement data, is allowed to immediately send acknowledgement data as required (where an acknowledgment request is set up) at a time point completely received the reception data RD and delivered the reception data RD in batch from the physical layer to the data-link layer.

As described above, the radio LSI in this embodiment has the latch circuit 25 and decoder 26 that is to latch frame control information out of the reception data RD being received by the transmitting-receiving section 20A and to decode the frame control information thereby decoding a data length and structure of address field so that the address field of the reception data RD can be latched according to the decoded address-field information, and the register 27 and comparing circuit 28 that is to determine a setting/resetting of frame pending depending upon a latched address field. This makes it possible to obtain information required for acknowledgement data before completely receiving the reception data RD. Therefore, there is a merit that no delay is caused in sending acknowledgement data.

Figure 11:
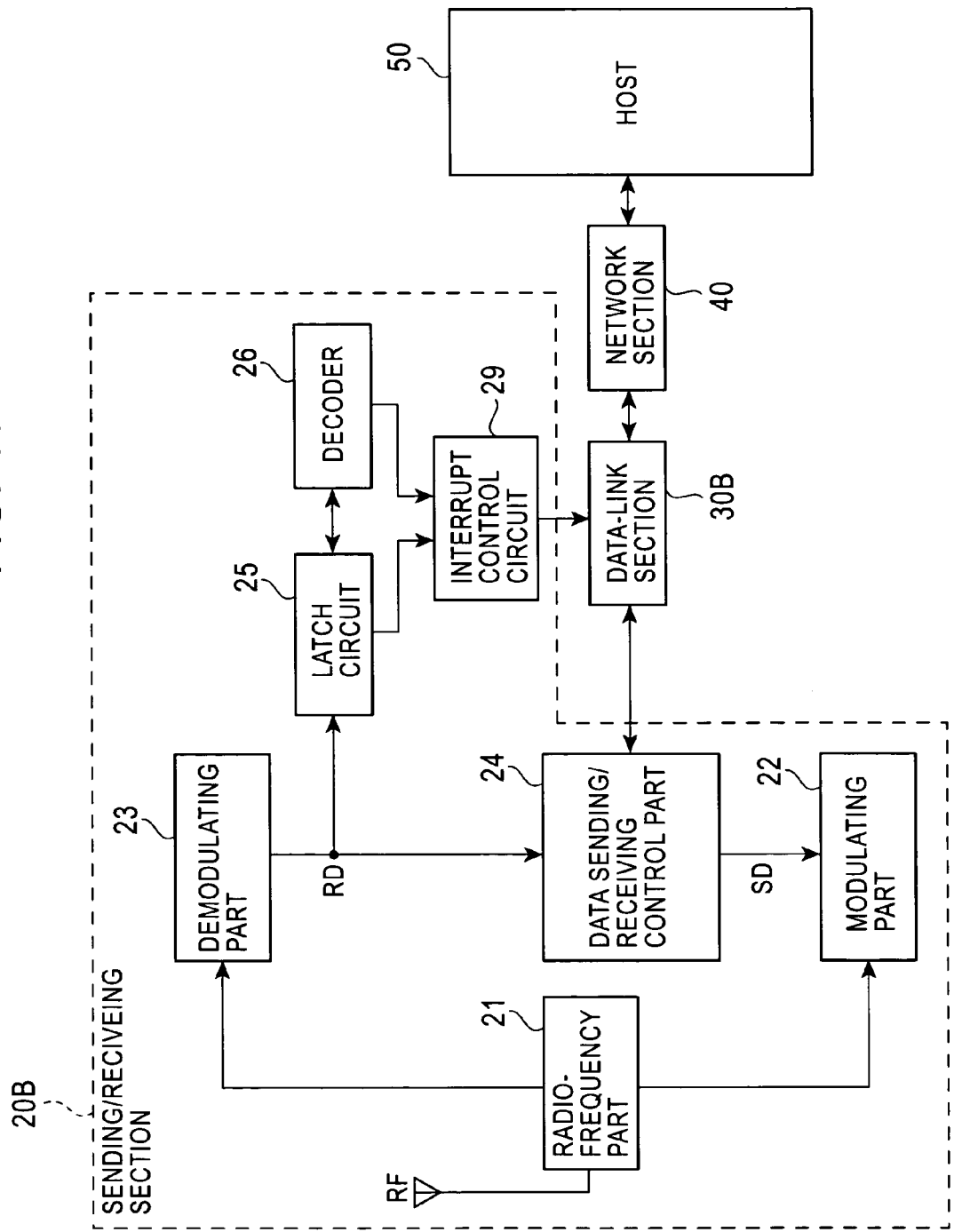
FIG. 11 is a schematic functional block diagram of a radio LSI showing a second embodiment of the invention.

FIG. 11 is a schematic functional block diagram of a radio LSI showing a second embodiment of the invention. The common elements to those of FIG. 8 are attached with the common references.

The radio LSI is provided with a transmitting-receiving section 20B and data-link section 30B somewhat different in function, in place of the transmitting-receiving section 20A and data-link section 30A of FIG. 8.

The transmitting-receiving section 20B has interrupt control means (e.g. interrupt control circuit) 29 in place of the register 27 and comparing circuit 28 of the transmitting-receiving section 20A. The interrupt control circuit 29 is to make an interruption to the data-link section 30B when fixed is the data in the address field of the reception data RD, and notify the address-field data to the MAC processing part of the data-link section 30B.

Meanwhile, the data-link section 30B is added with a function that, when detecting an interruption from the interrupt control circuit 29, address-field data is received from the interrupt control circuit 29 to thereby determine a setting/resetting of frame pending, in addition to the processing function as the usual data-link layer. The other configuration is similar to that of FIG. 8.

Figure 12:
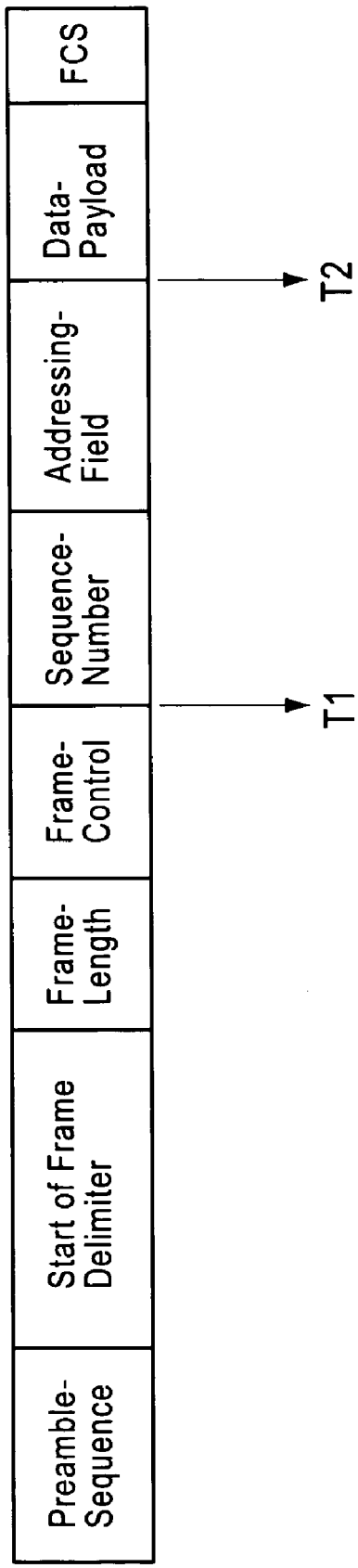
FIG. 12 is a figure showing a process flow of reception data in the second embodiment.

FIG. 12 shows a process flow of reception data in the second embodiment.

The radio-frequency part 21, the demodulating part 23, the data transmission-reception control part 24, the latch circuit 25 and the decoder 26 are to operate similarly to those of the first embodiment. When the frame control information (Frame-Control) in the reception data RD is fixed, or in other words successfully captured (at time T1), the frame control information is held by the latch circuit 25. The frame control information thus held is immediately provided to the decoder 26 where a data length and structure of the address field (Address-Field) is determined and provided to the latch circuit 25.

Furthermore, depending upon the information about the data length and structure of address field, the address field of the reception data RD is latched by the latch circuit 25 (at time T2).

At this time, interruption is made from the interrupt control circuit 29 to the data-link section 30B, to notify the address-field data to the data-link section 30B. The MAC processing part in the data-link section 30B determines a setting/resetting of frame pending (Frame-Pending) depending upon the notified address-field data. The subsequent operation is similar to that of the first embodiment.

As described above, the radio LSI in the second embodiment has the latch circuit 25 and decoder 26 that is to latch frame control information out of the reception data RD being received by the transmitting-receiving section 20B and to decode the frame control information thereby decoding a data length and structure of the address field so that the address field in the reception data RD can be latched according to the decoded address-field information, and the interrupt control circuit 29 that is to make an interruption to the data-link section 30B when the address field data is fixed, or in other words successfully captured, thereby notifying the address-field data. This makes it possible to obtain information required for acknowledgement data before completely receiving the reception data RD. Therefore, there is a merit similar to that of the first embodiment.

This application is based on Japanese Patent Application No. 2005-040082 which is hereby incorporated by reference.

What is claimed is:

1. A radio integrated circuit having an sending/receiving section that is to restore reception data in a predetermined format by demodulating a radio signal sent conformingly to a predetermined radio communication standard, and to send, with modulation, acknowledgement data generated according to information designated by the reception data, by means of a radio signal conforming to the radio communication standard, and a data-link section that is to receive the reception data restored in the sending/receiving section and to generate the acknowledgement data when there is designated an acknowledgement for the reception data, wherein said sending/receiving section comprises:
a registering part that registers an address of a destination of communication for which data to be sent has been prepared;
a first holding part that monitors the reception data under restoration and holds frame control information, of the reception data, containing information concerning a representing form of a source address;
a decoding part that decodes the frame control information held in the first holding part and outputs information about a data length and structure of address field representative of the source address in the reception data;
a second holding part that holds the source address out of the reception data under restoration, according to the data length and structure of address field outputted from the decoding part; and
a comparing part that compares the source address held in the second holding part with the address of the destination of communication registered in the registering part and provides a result of comparison to the data-link section.

2. A radio integrated circuit as claimed in claim 1, wherein said first and second holding parts are constituted by a latch circuit which performs steps of latching the frame control information and sending the frame control information to said decoding part at a first timing when the frame control information is successfully captured after receiving said reception data as an input, and receiving information of address field data length and structure determined by said decoding part, and latching the address field of the reception data at a second timing.

3. A radio integrated circuit as claimed in claim 1, wherein said decoding part determines a data length and data structure of the address field based on the frame control information supplied, and provides the data length and structure of the address field to said second holding part.

4. A radio integrated circuit as claimed in claim 1, wherein said comparing part compares between the address set up in said registering part and the information in the address field, and determines a setting/resetting of a frame pending, provides the setting/resetting to said data-link section as a comparison result.

5. A radio integrated circuit as claimed in claim 1, wherein said data-link section prepares the acknowledgement data based on said comparison result provided from said comparing part, and requests said sending/receiving section to send the acknowledgement data.

6. A radio integrated circuit having an sending/receiving section that is to restore reception data in a predetermined format by demodulating a radio signal sent conformingly to a predetermined radio communication standard, and to send, with modulation, acknowledgement data generated according to information designated by the reception data, by means of a radio signal conforming to the radio communication standard, and a data-link section that is to receive the reception data restored in the sending/receiving section and to generate the acknowledgement data when there is designated an acknowledgement for the reception data, wherein said sending/receiving section comprises:

a holding part that monitors the reception data under restoration and holds frame control information, of the reception data, containing information concerning a representing form of a source address;

a decoding part that decodes the frame control information held in the holding part and outputs information about a data length and structure of address field representative of the source address in the reception data; and an interrupt controlling part that notifies data of the source address to the data-link section by performing an interrupt thereto at a time when the source address is successfully captured from the reception data, while the sending/receiving section performs monitoring of the reception data under restoration according to the data length and structure of address field outputted from the decoding part, and wherein said data-link section determines a setting/resetting of a frame pending when receiving the address field data from said interrupt controlling part.

7. A radio integrated circuit as claimed in claim 6, wherein said holding part is constituted by a latch circuit which performs steps of latching said frame control information and sending it to said decoding part at a first timing when said frame control information is successfully captured after receiving said reception data as an input, and receiving information of address-field data length and structure determined by said decoding part, and latching the address field of said reception data at a second timing.

8. A radio integrated circuit as claimed in claim 6, wherein said decoding part determines a data length and data structure of the address field based on the frame control information supplied, and provides the data length and structure of the address field to said holding part.

9. A radio integrated circuit as claimed in claim 6, wherein said interrupt controlling part performs an interruption to the data-link section when said address field in the reception data is held by said holding part, to notify the address-field data to the data-link section.

* * * * *